Patented Nov. 28, 1922.

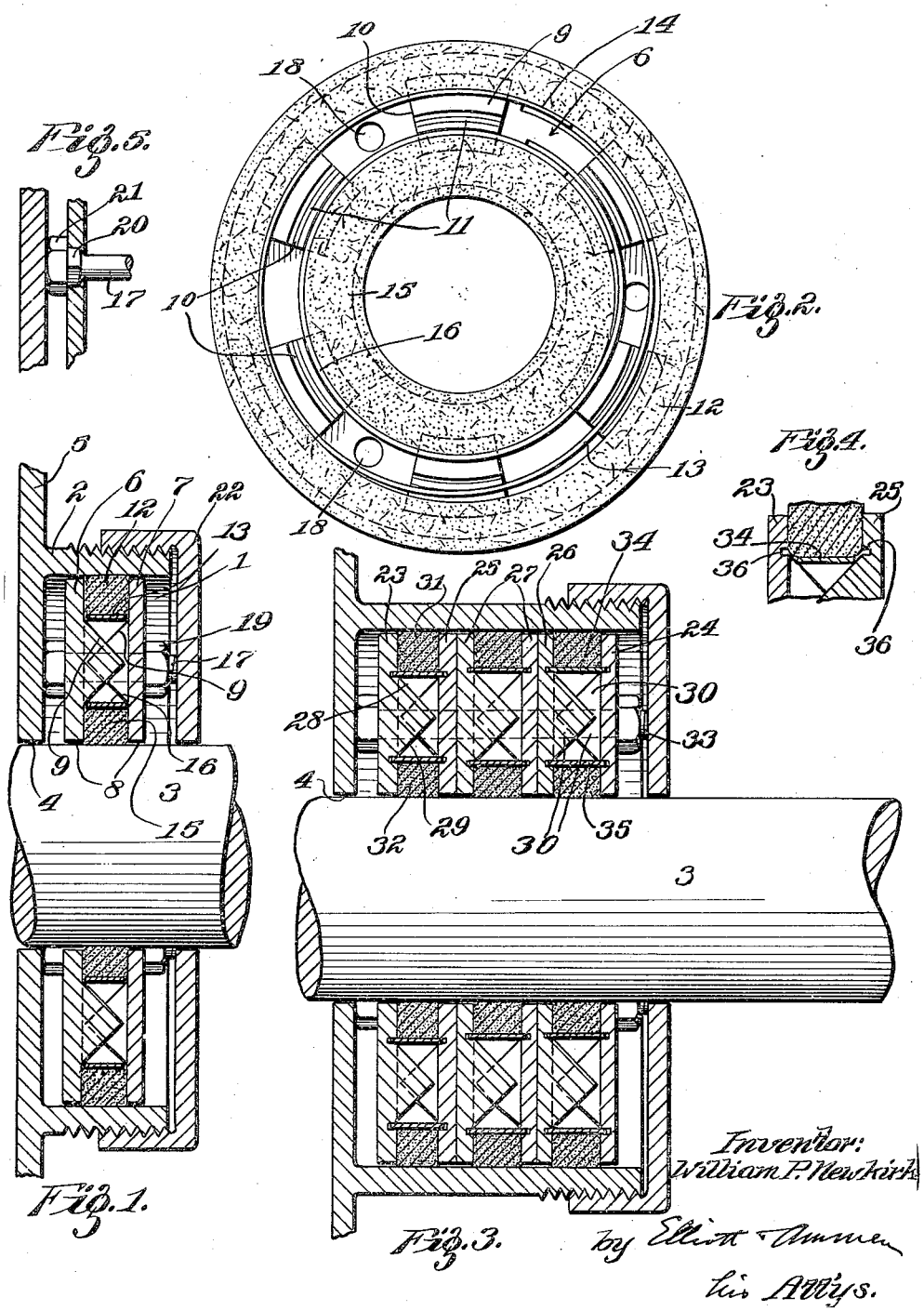

1,437,262

UNITED STATES PATENT OFFICE.

WILLIAM P. NEWKIRK, OF ST. LOUIS, MISSOURI, ASSIGNOR OF ONE-THIRD TO EDWARD J. BROCK AND ONE-THIRD TO GEORGE ALEXANDER BLACK, BOTH OF ST. LOUIS, MISSOURI.

PACKING.

Application filed April 30, 1920. Serial No. 377,834.

*To all whom it may concern:*

Be it known that I, WILLIAM P. NEWKIRK, a citizen of the United States, residing in the city of St. Louis and State of Missouri, have invented new and useful Improvements in Packing, of which the following is a specification.

This invention relates to stuffing boxes and particularly to the packing used for preventing leakage past the stuffing box. While features of the invention may be applied in stuffing boxes employing hard or metallic packing, the invention is expected to have its greatest utility in stuffing boxes employing soft or vegetable packing. In stuffing boxes, it has been the practice heretofore to clamp soft packing rings between rigid or metallic packing plates and then by drawing the plates toward each other the soft packing is squeezed to exert a pressure against the face or wall to be packed. This mode of operation results in a very effective packing of the adjacent faces of the rigid plates, but the pressure of the packing against the face or wall which is to be packed is incidental and is not as great as the pressure against the faces of the plates. In other words, with the construction usually employed the pressure of the packing is not developed in such a way as to realize the most efficient packing effect. According to my invention I hold the soft packing between rigid plates in such a way that the packing is freely movable laterally, that is to say, the packing is not clamped by the plates, and I provide simple means for effecting a lateral pressure back of the packing which forces it firmly against the wall or face which is to be packed. This of course, produces a squeezing action and does develop some pressure of the packing against the faces of the plates, but this pressure is merely incidental and the greatest pressure is developed directly against the face or wall which is to be packed. The general object of the invention is to produce a simple stuffing box for accomplishing these effects.

Further objects of the invention will appear hereinafter.

The invention consists in the novel features, and in the general combination of parts to be particularly described hereinafter, all of which contribute to produce a simple and efficient packing. A preferred embodiment of my invention will be particularly described in the following specification, while the broad scope of my invention will be pointed out in the appended claims.

In the drawing,

Figure 1 is a vertical section through a stuffing box of a simple type and illustrating a construction and organization of the parts that enables the stuffing box to pack an outside wall and inside wall or face simultaneously;

Figure 2 is a plan showing the construction and relation of the packing parts removed from the stuffing box and with the outside packing plate removed this view shows the packing in a less compressed condition than in Figure 1;

Figure 3 is a longitudinal section through a stuffing box, showing a type of construction which may be used where it is advisable to provide a relatively long stuffing box so as to increase the effectiveness of the packing: this view also illustrates a feature of construction which may be employed with the packing plates if desired;

Figure 4 is a vertical section through the edges of two co-operating packing plates and illustrating their relation, before substantial adjustment of the plates toward each other has occurred; and Figure 5 is a section illustrating a detail of means which may be employed for effecting the adjustment of the packing plates toward each other.

Before proceeding to a detailed description of this stuffing box, it should be understood that in the simplest type of stuffing box a single face would be packed but the most common form of stuffing box necessitates the packing of the inner face of the outer wall of the stuffing box and also the outer face of the part which passes through the stuffing box. This latter type of stuffing box is illustrated in Figure 1 in which a stuffing box comprises a packing chamber 1 surrounded by an annular wall 2 and through this packing chamber a part 3, such as a shaft or a piston rod passes. This part 3 passes through an opening 4 in a head or wall 5. The packing of this stuffing box, according to my invention involves the use of a pair of juxtaposed packing plates 6 and 7. These packing plates are simply rigid plates of metal or similar material of annular form so that they present central openings 8 through which the packed part 3 passes. The inside plate 6 is illustrated in Figure 2. The adjacent faces of these plates are similarly constructed, that is to say, each plate is provided with an outer circumferential inclined face 9 which is preferably discontinuous, that is to say, the inclined face is formed on a plurality of equidistantly spaced lugs 10. These plates are similarly provided with inner circumferential inclined faces 11 which are formed on the inner sides of the lugs 10. The plates fit together so that the lugs of one plate are received in the gaps between the lugs of the opposite plate. Between the plates I provide an outer soft packing washer 12 and behind this washer I provide means in the form of a follower ring 13 which presses against the back face of the packing washer; the edges of this ring, when the packing is first put in, rest against the inclined faces 9. The ring 13 is preferably formed of a strip of light sheet metal and is in the form of a split ring, the ends of which may overlap as indicated at 14 in Figure 2. In other words, this ring is an expansible split ring. Between the plates 6 and 7 adjacent their openings 8, I provide an inner soft packing washer 15 which is similar in construction to the washer 12, and behind this packing washer I provide a follower ring 16 which may be similar in construction to the follower ring 13, except that this ring is collapsible by pressure on its outer side; when this follower ring is put in place its edges will lie against the inclined faces 11 on the inner sides of the lugs. The two packing washers 12 and 15 are not clamped between the plates 6 and 7 but are freely movable in a lateral direction, that is to say, the washer 12 is free to move outwardly and the washer 15 is free to move inwardly against the shaft or rod 3. Any suitable means may be provided for forcing or drawing the plates 6 and 7 toward each other. By doing this the inclined faces 9 co-operate with the follower ring 13 in such a way as to force the ring outwardly and thereby press the packing washer 12 firmly against the inner face of the wall 2. In doing this a very effective packing of this wall takes place; of course, the outward pressure exerted upon the packing washer results in a certain amount of expansion of the washer in the direction in which the axis of the stuffing box extends and this pressure upon the plates of course assists in producing an effective packing action. In a similar manner the inclined faces 11 co-operate with an inner follower ring 16 to force the packing washer 15 inwardly against the face of the rod or shaft 3. The plates may be drawn together by means of bolts 17 which may pass through suitable openings 18 in the plates. As illustrated in Figure 2, the openings 18 pass through the plate between the lugs and hence the corresponding openings in the opposite plate 7 will pass through the lugs. The outer end of each bolt 17 carries an adjusting nut 19 which may be tightened up to pull the plates toward each other. These bolts may be of the carriage bolt type, that is to say, each bolt may have a square shank 20 adjacent to its head 21 (see Fig. 5). The stuffing box may be closed by a removable cap 22 which has threaded engagement with the outer face of the wall 2.

Where it is desired to increase the packing effect this may be accomplished in a very simple manner by employing a plurality of the plates 6 and 7 instead of employing simply a pair. Such construction is shown in Figure 3, in which it will be evident that the innermost plate 23 corresponds to the plate 6 and the outermost plate 24 corresponds to the plate 7. The plate 23 co-operates with a corresponding plate 25 which is constructed like the plate 7 and co-operates with the plate 23 in the same manner as the plates 6 and 7 co-operate; and plate 26 co-operates with the plate 24 in the same way. Between the plates 25 and 26 any number of packing units may be provided, each unit consisting of a pair of plates carrying packing washers. In the present instance, I simply illustrate a single pair of plates 27 between the plates 25 and 26. By placing two plates such as the plates 25 and 27 back to back, the simple type of plate may be used for multiple packing such as that shown in Figure 3, as well as in single packing, such as shown in Figure 1; but of course, it is obvious, that if desired, the plates 25 and 27 could be united into a single plate with lugs on both sides.

All of the plates 23 to 27 inclusive, shown in Figure 3, are provided with outer circumferential inclined faces 28 and inner circumferential faces 29 formed on lugs 30 as in Figure 1, and each co-operating pair of plates carry an outer packing washer 31 and an inner packing washer 32 which are freely movable respectively in an outward direction or an inward direction. When the plates are drawn toward each other by means of through-bolts 33 the follower rings 34 and 35 force the outer packing washers outwardly and the inner packing washers inwardly by co-operating with the inclined faces of the lugs, as described in connection with Figure 1. In Figure 4, I illustrate the relation of the parts before any substantial adjustment has taken place. The follower ring 34 may be as narrow or as wide as desired. Where it is desired to provide a relatively wide follower ring and at the same time to permit a considerable amount of adjustment of the plates toward each other, the adjacent faces of each pair of plates may be provided with annular grooves 36 which are disposed at the bases of the lugs. When the rings 34 and 35 have been adjusted so far that they pass off of the inclined faces of the lugs, their edges will pass into the grooves 36 and this will permit an increased amount of adjustment of the plates toward each other corresponding to the depth of the grooves 36.

In reading Figure 1, it should be understood that the follower rings 13 and 16 are illustrated in the extreme positions to which they can be pushed by the inclined faces of the lugs against which their edges rest. It should be understood, however, that when the packing 12 has been just put in place, the edges of the follower rings ride on the inclined faces in the manner illustrated in Figure 4. Also in Figure 3, it should be understood that the follower rings have been illustrated in their extreme adjusted position.

It is understood that the embodiment of the invention described herein is only one of the many embodiments my invention may take, and I do not wish to be limited in the practice of my invention nor in my claims, to the particular embodiment set forth.

What I claim is:—

1. In a stuffing box, the combination of a packing-chamber, a pair of juxtaposed packing plates having circumferential inclined faces on their adjacent sides, mounted in the packing-chamber, a packing washer disposed between the plates but freely movable laterally, a follower ring behind the packing washer and engaging the inclined faces, and means for drawing said plates together whereby the inclined faces and the follower ring co-operate to force the washer laterally to exert a packing action in said chamber.

2. In a stuffing box, the combination of a packing chamber, a pair of juxtaposed packing plates having a plurality of circumferentially disposed lugs on their adjacent sides, said lugs having inclined faces and the lugs of one plate being disposed between the lugs of the other plate, a soft packing washer disposed between the plates but freely movable laterally, a follower ring behind the packing washer and engaging the inclined faces of the lugs, and means for drawing said plates together whereby the inclined faces and the follower ring co-operate to force the washer laterally to exert a packing action in said chamber.

3. In a stuffing box, the combination of a packing chamber having an annular wall, and through which the part to be packed passes, a pair of juxtaposed annular packing plates within the packing chamber, having outer circumferentially disposed inclined faces and inner circumferentially disposed inclined faces on their adjacent sides, an outer soft packing washer disposed between the plates adjacent the wall of the packing chamber, but freely movable outwardly between the plates, an expansible follower ring behind the outer packing washer and engaging the said outer inclined faces, an inner soft packing washer disposed between the plates adjacent to the part to be packed, a collapsible follower ring disposed around the outer side of the inner packing washer and engaging the said inner inclined faces of the plates, said inner washer being freely movable laterally between the plates, and means for drawing said plates toward each other in an adjusting movement whereby the inclined faces and the follower rings co-operate to force the washers laterally to exert a packing action in said chamber.

4. In a stuffing box, the combination of a packing chamber having an annular wall, and through which the part to be packed passes, a pair of juxtaposed annular packing plates within the packing chamber, having outer circumferentially disposed inclined faces and inner circumferentially disposed inclined faces on their adjacent sides, an outer soft packing washer disposed between the plates adjacent the wall of the packing chamber, but freely movable outwardly between the plates, an expansible follower ring behind the outer packing washer and engaging the said outer inclined faces, an inner soft packing washer disposed between the plates adjacent to the part to be packed, a collapsible follower ring disposed around the outer side of the inner packing washer and engaging the said inner inclined faces of the plates, said inner washer being freely movable laterally between the plates, and means for drawing said plates toward each other in an adjusting movement whereby the inclined faces and the follower rings co-operate to force the washers laterally to exert a packing action in said chamber, said packing plates having annular grooves to receive the edges of the follower rings at the limit of the adjusting movement.

5. In a stuffing box, the combination of a packing-chamber having an annular wall and through which the part to be packed passes, a plurality of juxtaposed annular packing plates within the packing chamber, an outer soft packing washer disposed between the plates, and adjacent to the wall of the packing chamber, but freely movable outwardly between the plates, an expansible follower ring behind the outer packing washer, inner soft packing washers disposed between the plates adjacent to the part to be packed, and freely movable between the plates, collapsible follower rings disposed respectively around the outer sides of the inner packing washers, said plates having lugs projecting toward each other and having inclined faces engaging said follower rings, the lugs of one plate being received between the lugs of the opposite corresponding plate, and means for drawing said plates toward each other, whereby the inclined faces displace the follower rings and force the washers laterally to exert a packing action in the chamber.

In testimony whereof, I have hereunto set my hand.

WILLIAM P. NEWKIRK.